(12) United States Patent
Ricketts

(10) Patent No.: US 8,052,374 B2
(45) Date of Patent: Nov. 8, 2011

(54) CUT-OFF CONSTRUCTION FOR TRANSVERSE FAN ASSEMBLIES THAT HAVE ELONGATED FAN BLADES OF ARCUATE CROSS-SECTION

(75) Inventor: Jonathan E. Ricketts, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 493 days.

(21) Appl. No.: 12/321,076

(22) Filed: Jan. 15, 2009

(65) Prior Publication Data

US 2010/0178171 A1    Jul. 15, 2010

(51) Int. Cl.
    F04D 5/00    (2006.01)
(52) U.S. Cl. .......................... 415/53.1; 415/203; 460/98
(58) Field of Classification Search .................. 415/53.1, 415/203; 460/98
    See application file for complete search history.

(56) References Cited

U.S. PATENT DOCUMENTS

| | | |
|---|---|---|
| 997,127 A | 7/1911 | Hanrahan et al. |
| 1,050,540 A | 1/1913 | Hohman |
| 3,415,443 A | 12/1968 | Glucksman |
| 3,469,773 A | 9/1969 | Pool et al. |
| 3,533,413 A | 10/1970 | Schenk |
| 3,664,349 A | 5/1972 | Quick |
| 3,833,006 A | 9/1974 | Temple |
| 4,078,870 A | 3/1978 | Keller et al. |
| 4,906,219 A * | 3/1990 | Matousek et al. .............. 460/98 |
| 5,094,586 A | 3/1992 | Takada et al. |
| 5,165,855 A | 11/1992 | Ricketts et al. |
| 5,197,850 A | 3/1993 | Shinobu et al. |
| 5,428,945 A | 7/1995 | von Allwörden et al. |

(Continued)

FOREIGN PATENT DOCUMENTS

DE    3048571    12/1980

(Continued)

OTHER PUBLICATIONS

Performance Prediction of Cross-Flow Fans Using Mean Streamline Analysis, International Journal of Rotating Machinery 2005:2, 112-116 Jae-Won Kim, et al.

(Continued)

Primary Examiner — Jarrett Stark
Assistant Examiner — Nicholas Tobergte
(74) Attorney, Agent, or Firm — Michael G. Harms

(57) ABSTRACT

A cut-off construction for a transverse fan assembly, including for use with agricultural combine harvesters, to permit the transverse fan assembly to be operated to provide increased air flow volume at a lower rotational fan speed, which cut-off construction includes generally planar inner surfaces on first and second body portions that are positioned laterally to one another along the top of the output throat of the air plenum of the transverse fan assembly between the outer periphery of the fan and a baffle construction of the transverse fan, such that the inner surface of the first body portion is disposed at a cut-off inclination angle $\alpha$, dependent upon certain parameters of the fan, and the inner surfaces of the first and second body portions intersect with one another in such a way that an upper wall for the output throat is formed by the cut-off construction and by the baffle construction of the fan assembly, which upper wall has a concavity formed therein and therealong near the outer periphery of the fan that effects a shift of the steering vortex of the fan in such a way as to permit the fan to operate with increased air flow volume at lower rotational fan speed.

25 Claims, 9 Drawing Sheets

U.S. PATENT DOCUMENTS

| | | |
|---|---|---|
| 5,449,271 A | 9/1995 | Bushnell et al. |
| 5,599,162 A | 2/1997 | Ricketts et al. |
| 5,868,551 A | 2/1999 | Smiley, III et al. |
| 2005/0013685 A1 | 1/2005 | Ricketts et al. |

FOREIGN PATENT DOCUMENTS

| | | |
|---|---|---|
| JP | 05126088 | 5/1993 |

OTHER PUBLICATIONS

Numerical And Experimental Investigations Of Cross-Flow Fans, Journal of Computational and Applied Mechanics, vol. 5, No. 2, (2004), pp. 251-261 Martin Gabi and Toni Klehmm.

* cited by examiner

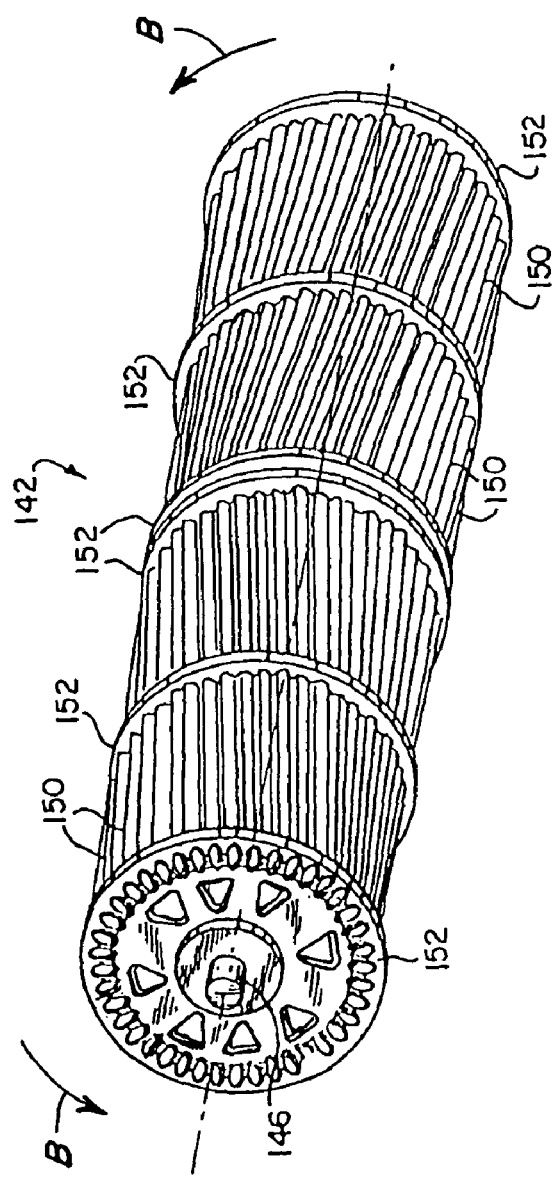
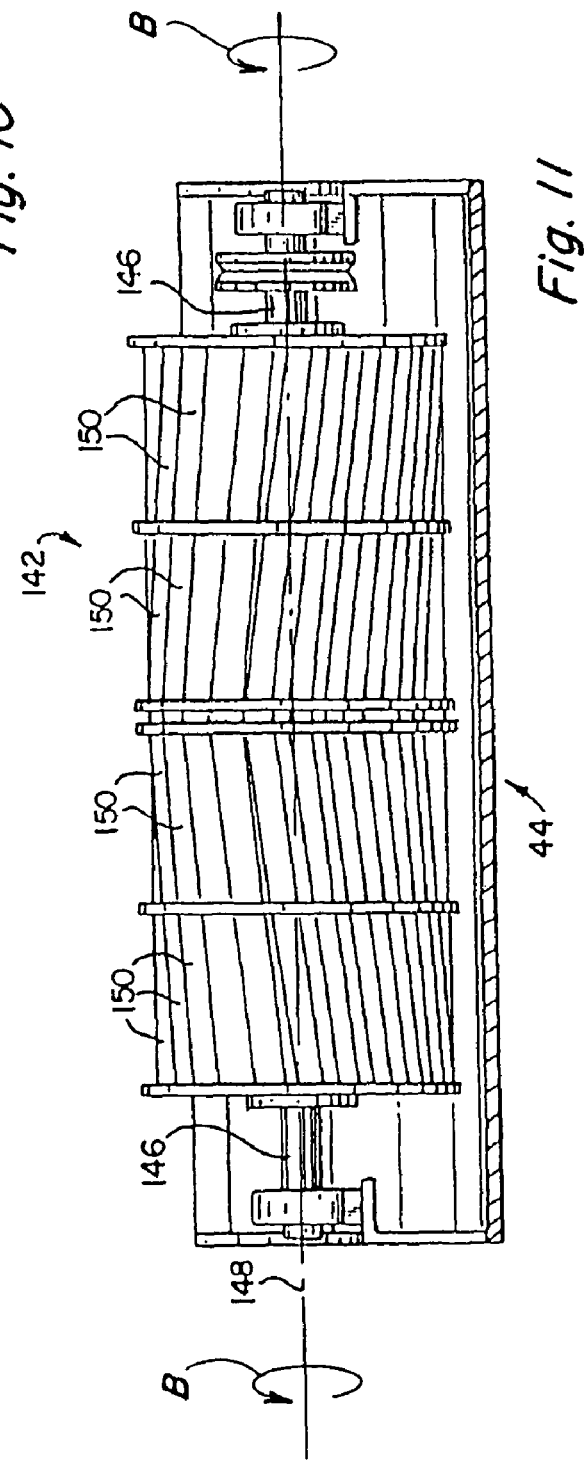

CUT-OFF CONSTRUCTION FOR TRANSVERSE FAN ASSEMBLIES THAT HAVE ELONGATED FAN BLADES OF ARCUATE CROSS-SECTION

TECHNICAL FIELD

The present invention relates generally to an improved cut-off construction for transverse fan assemblies, particularly as such transverse fan assemblies are utilized with agricultural combine harvesters in grain cleaning systems, which transverse fan assemblies include a fan mounted generally cross-wise within an air plenum that has an air inlet, an air outlet, and an output throat from the downstream side of the fan towards the air outlet, with a baffle construction for separating the air inlet and air outlet, and wherein the fan has a plurality of elongated fan blades of arcuate cross-section disposed spaced from one another about the axis of the fan and extending generally along the expanse of the fan and about the axis of the fan.

The improved cut-off construction is positioned generally adjacent to the fan on its downstream side to cut off and direct the flow of air from the fan towards the air outlet and is so formed and configured to permit the production by the transverse fan assembly with which the improved cut-off construction is employed of greater air flow volume at lower fan revolutions per minute and to increase the ability of the fan to carry a higher pressure load.

BACKGROUND ART

In the harvesting of crops it is desired that the grain be separated from other elements or portions of the crop, such as from pod or cob fragments, straw, stalks, and the like. Agricultural combines typically have employed a rotary threshing or separating system for separating and segregating the grain from such other crop elements or portions. In general, rotary threshing or separating systems are so designed that, as threshing occurs, the resulting crop material is typically caused to fall or be conveyed to a clean grain and tailings conveying system, sometimes also referred to as a collecting and conveying system, or even more simply as a conveying system, for further processing, which processing typically includes the feeding of such resulting crop material from the rotary threshing or separating system onto an underlying vibratory cleaning system or onto one or more conveyors for conveyance to such a cleaning system.

The cleaning system typically includes a set of stacked sieves or shoes that are reciprocally moved, usually in the fore and aft directions, to separate or sift the grain from tailings and material other than grain (MOG). With many combines, as the grain is cleaned from the MOG, it falls through the sieves and drops onto or into one or more underlying clean grain pans that are disposed below the sieves, which pans feed the clean grain to an intersecting, cross, generally laterally extending, clean grain conveyance trough, sometimes referred to as the clean grain auger trough or, more simply, the clean grain trough.

The laterally extending clean grain conveyance trough receives the clean grain conveyed thereto from the clean grain collecting troughs and typically has associated therewith a conveyance mechanism, often in the form of an auger extending therethrough, for moving and delivering the clean grain in such clean grain conveyance trough to an elevator that carries the clean grain up to a clean grain tank.

During the vibration of the sieves, air is blown upwardly and rearwardly through the sieves to carry lighter elements of the MOG, or chaff, away. The heavier elements and tailings that are too large to fall through the sieves and too heavy to be blown away are caused to be moved by the vibrations, generally rearwardly along the top surfaces of the sieves, towards and over rear edges of the sieves to fall onto a tailings pan located below and extending somewhat beyond such rear edges. The tailings pan, similarly to the clean grain pan, feeds the tailings to an intersecting, cross, generally laterally extending, tailings conveyance trough, sometimes referred to as the tailings auger trough or, more simply, the tailings trough.

The sidewardly extending tailings conveyance trough receives the tailings conveyed thereto from the tailings collecting pan and/or troughs and has a conveyance mechanism, often in the form of an auger extending therethrough, for moving and delivering the tailings to a tailings return conveyor operable for carrying the tailings upwardly, back to the cleaning or separating system of the combine, for reprocessing, including further threshing of the tailings.

Over the years, fans of various types, including, by way of example, vane-type fans, paddle fans, and cross-flow fans of various designs, all of which are capable of producing air to be blown upwardly and rearwardly through the sieves to carry the chaff away from the grain and tailings deposited onto the cleaning system sieves, have been employed in or with agricultural combines to provide the desired air flow. Such chaff is typically blown into an optional chaff spreader, operable for distributing the chaff over a desired swath of the field from which the crop is cut, or directed into an optional chopper, operable for mixing the chaff with straw for chopping and distributing such mix, or simply directed downwardly onto the field through a rear opening of the combine.

While all of such noted fan types can operate to produce air flows for carrying chaff away, some fan types have proven more effective at producing the air flow volume desired. Ideally, the fan employed will be able to develop a maximal air flow volume at as low a fan speed as possible. For a number of years now, transverse or cross-flow fans of various designs have been recognized to be particularly well-suited for the noted purpose.

Transverse or cross-flow fan assemblies are well known in the art, and such fan assemblies typically have included axially spaced disk-like members that support a plurality of elongated fan blades in some form of cylindrical pattern or array, often with as many as thirty-six fan blades disposed in a cylindrical arrangement about the axis of rotation of the fan. With some fan assemblies, straight and cross-sectionally curved fan blades have been disposed with the tips of the blades extending generally parallel to the axis of rotation, which fan blade configurations are generally hereinafter referred to as axially aligned fan blade arrangements. In more recent years, newer types of transverse fan assemblies have been developed in which the fan blades in a number of fan assemblies have, instead, been angled, such as in a chevron blade arrangement. Examples of two transverse fan assemblies that have been advantageously employed in combines is found in U.S. Pat. No. 5,599,162, with one disclosed fan assembly utilizing an axially aligned fan blade arrangement and another disclosed fan assembly utilizing a chevron blade arrangement, in both of which assemblies the fan blades have an arcuate cross-section.

Transverse fans have proven particularly useful in combine cleaning systems because such fans can produce a wide stream of air that can be directed upwardly toward the cleaning sieves of the combine cleaning systems but require relatively little space. Such fans, in typical agricultural combines, are disposed such that their air outputs are below the sieves of the cleaning system, and, so, are positioned close to the ground over which the combine moves.

As will be appreciated, rocks and other debris commonly found in fields can be detrimental to the normal high speed rotational operation of fan blades, and broken and/or bent fan blades can affect fan performance, and consequently, the overall efficiency of a combine in which a transverse fan assembly is installed. Accordingly, when transverse fan assemblies are employed with typical combines, the fan blades are normally protected by installing the fan within a fan wrapper or air plenum, with the fan being rotatably mounted within an inner chamber of the air plenum to operably drive air between an air inlet and an air outlet.

Desirably, such transverse fans, especially as employed in combines, will thus provide a relatively wide output of air, and will do so in such a way that they carry sufficient pressure so that, when material is deposited onto the sieves of the cleaning system, they will continue to operate to produce an air flow directed towards the sieves that is adequate for the intended purposes. As noted previously, ideally, such a fan will operate at as low a speed as possible to develop the desired air flow. To some extent, increased air flow can be effected by increasing the rotational speed of the fan, but such an increase in rotational speed is not without consequences, including, generally, increased noise and wear and tear on the fan.

Consequently, users have continued to seek improved fan constructions in which better air flow can be developed while they operate at low speeds.

Although transverse fans have been employed for many years, due to the complex nature of air flow within transverse fan constructions and difficulties in predicting and determining what the consequences of various changes in the design and operation of such transverse fans may be, development of improved fan constructions has proved problemsome.

In general, as transverse fans operate, a relatively large vortex, sometimes referred to as a steering vortex, is formed, generally situated partially within and partially outside of the fan rotor or impeller, near a fan cut-off, which is sometimes referred to as a stabilizer. The position, size, and intensity of such steering vortex is strongly influenced by the structural features of the fan, including the geometric parameters thereof, as well as the volume rate and pressure rate of the fan. Additional, or secondary, vortices may also be produced in the inlet and outlet zones of the fan, and the shape of the air plenum surrounding the fan rotor can greatly influence the performance characteristics of the fan.

In efforts to develop an improved transverse fan construction, it has been found that changes in the construction and configuration of the fan cut-off, including an inclination of the cut-off relative to passing fan blades, can affect the position of the steering vortex and the performance characteristics of the fan. In particular, it has now been found that, when the present invention is incorporated into a transverse fan of the type that has been employed in recent years in combine harvesters for providing air flow to cleaning systems of such harvesters, the transverse fan can provide a better or increased air flow while still operating at a low rotational speed, thereby resulting in better fan performance without the adverse consequences that would otherwise result as fan speed was required to be increased to secure the increased air flow.

SUMMARY OF THE INVENTION

Consequently, what is now disclosed is an improved cut-off construction for transverse fan assemblies that have elongated fan blades of arcuate cross-section, particularly as such transverse fan assemblies may be utilized in combine harvesters, that permits the production by such transverse fan assemblies of greater air flow volume at lower fan revolutions per minute and increases the ability of such fan assemblies to carry a higher pressure load.

Such improved cut-off construction is intended for use in or with transverse fan assemblies that include a fan mounted generally within an air plenum and wherein the fan has a plurality n of elongated fan blades of arcuate cross-section disposed generally radially about the axis of the fan, preferably generally uniformly at angles $\gamma$ from one another, and extending generally along the expanse of the fan, with the outer tips of adjacent fan blades thus being generally distanced from one another by a blade tip distance A. The improved cut-off construction can be utilized not only with transverse fan assemblies wherein the fan blades are generally axially aligned with the axis of the fan, but also with transverse fan assemblies wherein the fan blades extend about the axis of the fan in a cylindrical configuration to wrap therearound.

The improved cut-off construction is a body construction that extends across the air plenum generally along and adjacent to the outer periphery of the fan on the downstream side of the fan along the expanse of the fan and projects generally laterally or outwardly from the fan from a forward position in the output throat of the air plenum near the outer periphery of the fan on its downstream side, designated forward position FP, to join the baffle construction and, with the baffle construction, to form an upper wall along the output throat. Such body construction includes first and second body portions that are positioned laterally to one another along the top of the output throat of the air plenum, each of which body portions has a generally planar inner surface on one side thereof facing the output throat.

The first body portion extends generally across the air plenum along forward position FP with the generally planar inner surface thereof projecting laterally from position FP and extending therefrom along a line generally tangent to the fan blade at its outer tip, designated as blade tip tangent line T1, as such fan blade rotates past such forward position FP. The angle formed between the blade tip tangent line T1 and a second line generally tangent to the outer periphery of the fan generally at or near the outer tip of the fan blade, designated fan periphery tangent line T2, is defined to be cut-off inclination angle $\alpha$.

Forward position FP will typically be located near the rearmost outer periphery of the fan on the downstream side of the fan, typically at or above a centerline through the frontmost and rearmost outer peripheries of the fan, defined as centerline CL. In general, the height of forward position FP above the centerline CL will be limited to a height dependent upon the cut-off inclination angle $\alpha$, which angle is itself dependent in large part upon the radius of curvature R of the arcuate fan blades and their positionings about the axis of the fan. With cut-off inclination angle $\alpha$ an acute angle, forward position FP will typically be located such that, relative to fan centerline CL and a line tangent to the outer periphery of the fan at its rearmost point, defined as rearmost fan periphery tangent line TR, the maximum location of forward position FP above the centerline CL and forward of rearmost fan periphery tangent line TR, so as to maintain the cut-off construction closely adjacent the outer periphery of the fan, will be at a position such that the subtended angle formed by the rearmost fan periphery tangent line TR and a fan periphery tangent line TR2 passing approximately through such maximum location position will not exceed the value of the cut-off inclination angle $\alpha$.

The generally planar inner surface of such first body portion thus projects laterally from the forward position FP in the air plenum at cut-off inclination angle α and extends generally along blade tip tangent line T1 until it intersects the generally planar inner surface of the second body portion at a juncture therebetween to form juncture angle β between such planar inner surfaces. The generally planar inner surface of the second body portion projects laterally from such juncture and extends towards the air outlet along a projection that extends generally from such juncture through the output throat of the air plenum towards the air outlet until it meets and joins the baffle construction in a generally smooth transition.

Such cut-off construction configuration introduces into the upper wall for the output throat formed by the cut-off construction and the baffle construction a concavity or recess near the outer periphery of the fan, which concavity and the configuration of which, especially due to the position of the inner surface of the first body portion at cut-off inclination angle α, effects a shift of the steering vortex of the fan to permit increased air flow volume at lower rotational fan speed.

It has been found preferable that the lateral length $\ell$ of the generally planar inner surface of the first body portion, as measured between forward position FP and the juncture with the generally planar inner surface of the second body portion, be such that the juncture position will generally fall within the central third of the spacing distance A between adjacent fan blades when a fan blade at its outer tip is aligned with said first portion. Such length $\ell$ may, however, dependent upon other constructional details of a particular transverse fan assembly and its baffle construction, be extended to be longer, but will generally be limited to a length $\ell$ determined by the intersection of the blade tip tangent line T1 and a fan radian line extending through the outer tip of an adjacent, leading fan blade, designated fan radian line FR1.

It has also been found preferable that the juncture angle β between the generally planar inner surface of the first body portion and the generally planar inner surface of the second body portion at the juncture therebetween be within the range $(90°+α) \leq β \leq (90°+α+γ)$, and, more preferably, be approximately equal to or slightly less than $90°+α+γ$.

In one preferred embodiment, when the cut-off construction according to the present invention is employed with a transverse fan assembly wherein the fan blades are generally axially aligned with the axis of the fan, wherein the fan has a diameter D of approximately 15.5±0.05 in. (and thus a radius r of approximately 7.75 in.) with 20 fan blades spaced generally uniformly around the axis of the fan at angles γ of approximately 18°, wherein the fan blades have a radius R of curvature of approximately 2.05±0.05 in. and a height or side-to-side width W of approximately 2.55±0.05 in., wherein the distance G between the outer tips of adjacent fan blades is approximately 2.35±0.05 in., and wherein the distance H between the inner tips of adjacent fan blades is approximately 1.65±0.05 in., the cut-off inclination angle α associated with the first portion of the cut-off construction will thus be about 28°. With such a fan embodiment, the generally planar inner surface of the first body portion will preferably extend a length l of approximately 0.75 in. from forward position FP which is closely adjacent to the outer periphery of the fan along blade tip tangent line T1, with the position FP being disposed near to or somewhat above centerline CL, and the juncture angle β formed by the generally planar inner surface of the first body portion and the generally planar inner surface of the second body portion at their juncture will preferably be approximately 135°, which is slightly less than the preferred upper limit of $90°+α+γ$ which, with the preferred construction dimensions noted hereinabove, would equal approximately 136°.

When such preferred embodiment is viewed from the side of the air plenum, with the fan generally to the left and the air outlet of the air plenum generally to the right, the inner surfaces of the first and second body portions intersect with one another along the expanse of the juncture therebetween at a generally uniform juncture angle β, which extends generally across the air plenum, and such inner surfaces thus appear to form an inverted "V" shape, often with the leading edge of the inverted "V" appearing steeper and with the trailing leg appearing flatter so that the inverted "V" shape appears to be tilted somewhat to open the mouth of the "V" somewhat more towards the air outlet.

Such a cut-off construction embodiment may likewise be employed with a transverse fan assembly having generally similar dimensions, but wherein the fan blades of the fan are disposed about the axis of the fan to define a chevron blade configuration, with the leading portions of the individual fan blades being generally centered along the cross-plenum length of the fan as the fan is rotated forwardly. In such event, a user may be able to realize both the advantages attendant to use of a chevron-bladed fan as well as the advantages realized by use of a cut-off construction according to the present invention.

In an alternative embodiment, the cut-off construction may be so configured that, especially if such alternative embodiment is employed with a transverse fan assembly having generally similar dimensions and axially aligned fan blades, the air flow from the fan will be cut off somewhat similarly to what is achieved when the previously described cut-off embodiment is employed with a fan that has fan blades disposed about the axis of the fan to define a chevron blade configuration with the leading portions of the individual fan blades being generally centered along the cross-plenum length of the fan as the fan is rotated forwardly. In such alternative embodiment the first and second body portions of the cut-off construction will each have a pair of oppositely disposed end portions that are angularly inclined from the opposite sides of the air plenum towards the center thereof so that inner surfaces of the first and second body portions have a chevron-like configuration, generally appearing to have an inverted "V" shape when such body portions are viewed looking from the fan towards the air outlet of the air plenum.

With such an alternative embodiment, the juncture angle β formed by the intersection of the inner surfaces of the first and second body portions may not remain uniform along the cross-plenum expanse of the cut-off construction in each plane perpendicular to the expanse of the fan, but may, for example, vary from a larger angle in planes nearer the opposite ends of the fan to a smaller angle in a plane near the center of the fan. In general, however, the inner surfaces of the first and second body portions of the cut-off construction appear, in any given plane perpendicular to the fan and extending through the output throat of the air plenum, to form an inverted "V" shape similar to the inverted "V" shape discussed hereinbefore with respect to the cut-off construction for the fan with axially aligned fan blades.

As a consequence of the shifting of the steering vortex effected by such cut-off constructions, and the resultant increase in air flow volume that can therefore be realized as the fan operates at lower rotational speeds, as well as the resultant higher pressure load capacity of the transverse fan assembly, cleaning operations in combine harvesters can be more efficiently performed, equipment life can be increased, and associated costs can be minimized.

BRIEF DESCRIPTION OF THE DRAWINGS

FIG. 10 is a perspective view, from the left rear, similar to FIG. 4, but of a typical form of a fan rotor assembly of the transverse fan assembly that utilizes fan blades of arcuate cross-section in a chevron arrangement.

FIG. 11 is a view similar to FIG. 5 of a typical transverse fan assembly of which the fan rotor assembly of FIG. 10 is a part.

DETAILED DESCRIPTION OF THE INVENTION

Figure 1:
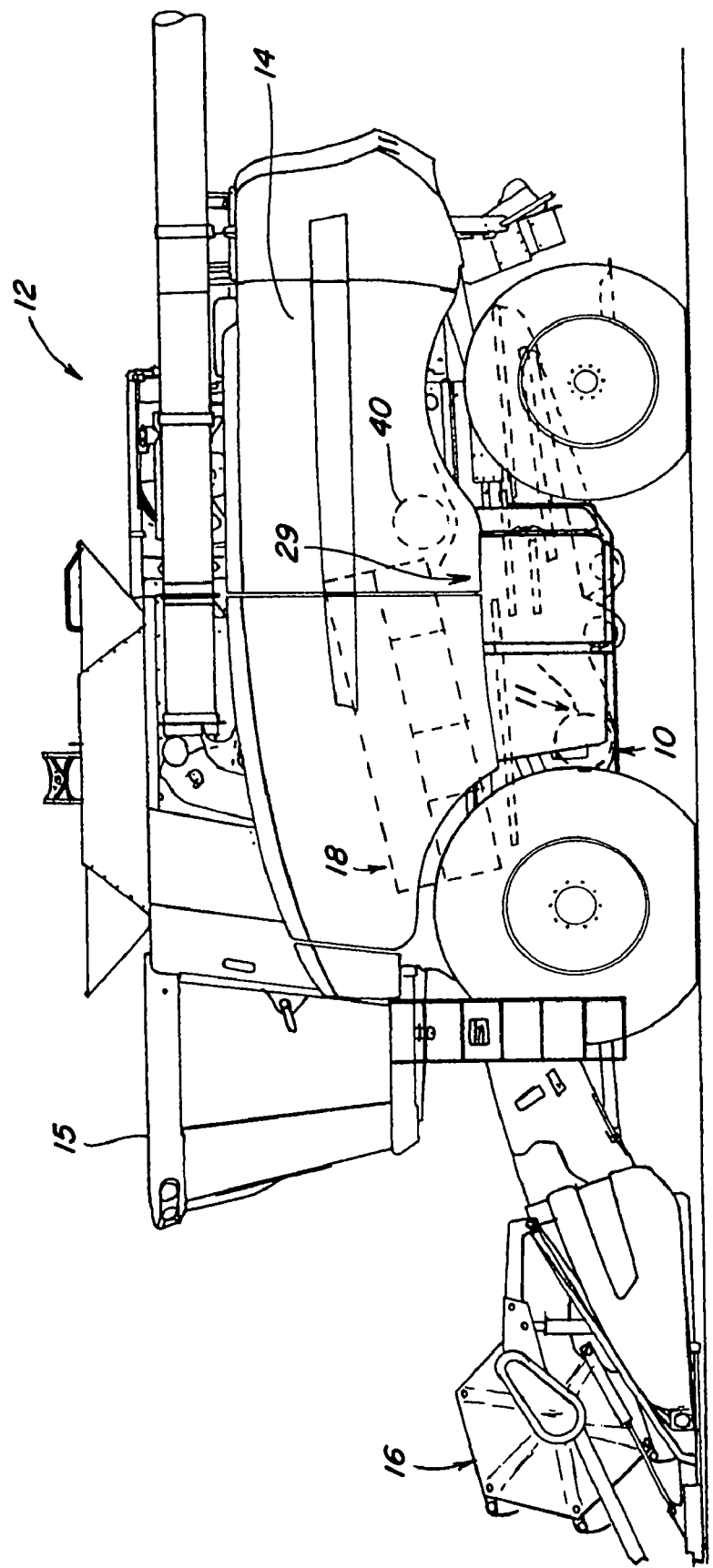
FIG. 1 a left side view of a typical combine harvester in which a transverse fan assembly having a cut-off construction according to the present invention is installed in conjunction with a cleaning system.
Figure 2:
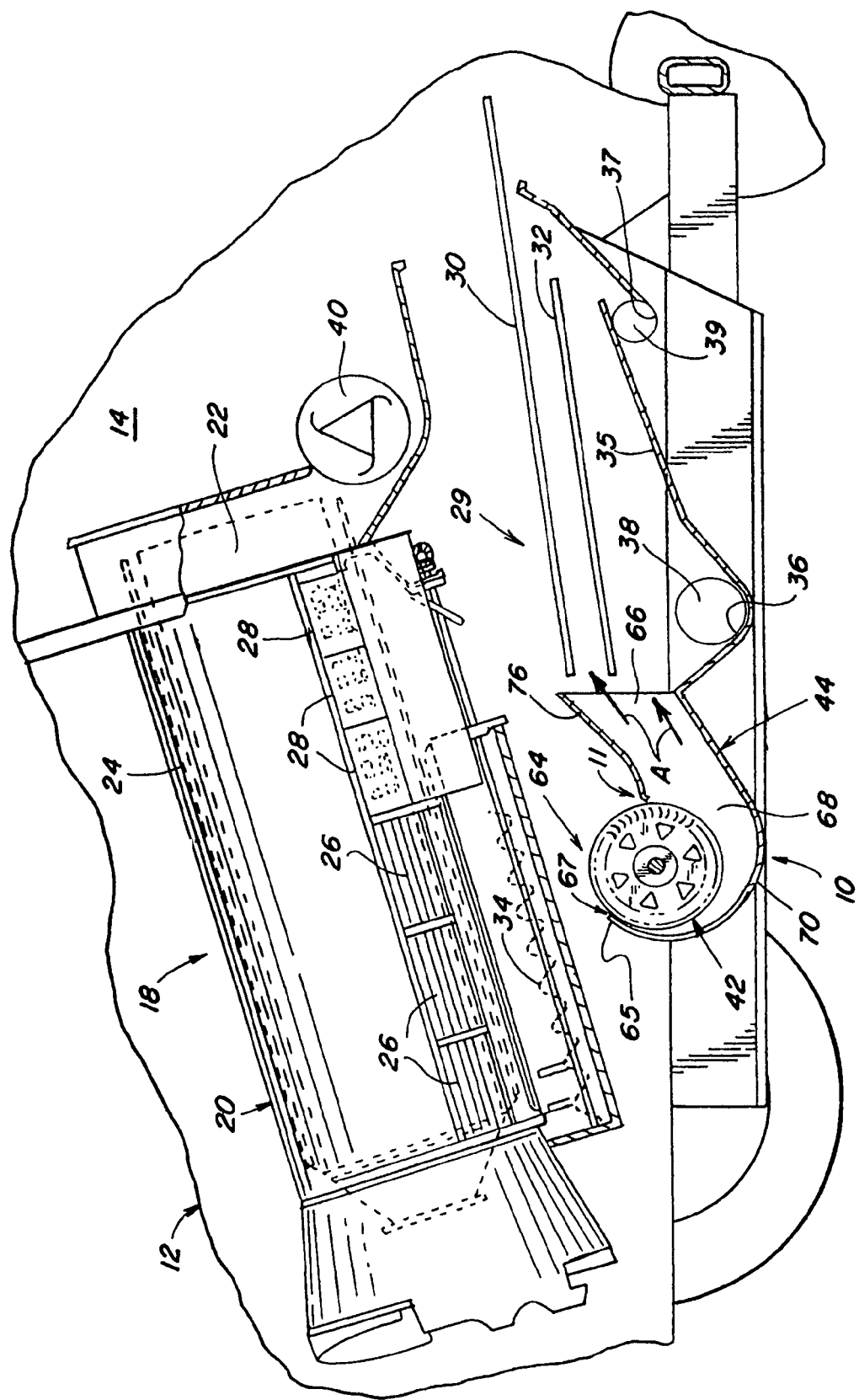
FIG. 2 is a partial cross-sectional view of a portion of the combine harvester of FIG. 1 showing the threshing apparatus and cleaning system of such combine harvester in conjunction with a preferred embodiment of a transverse fan assembly.

Referring now to the drawings, wherein preferred embodiments of a transverse fan assembly that includes the present invention are shown, wherein like numerals refer to like items, wherein certain elements and features may be labeled or marked on a representative basis without each like element or feature necessarily being individually shown, labeled, or marked, wherein certain elements may be labeled and marked in only some, but not all, of the drawing figures, and wherein features or components labeled or marked with identification numerals and associated prime indicators correspond generally to similar or like features or components labeled or marked with the same identification numerals but without associated prime indicators, FIGS. 1 and 2 identify the general location of and depict one preferred embodiment of a transverse fan assembly 10 that has associated therewith a cut-off construction 11 according to the present invention arranged in operable combination with a typical, conventional, self-propelled agricultural combine harvester 12 of the axial-flow type wherein crop material is threshed and separated while it is advanced by and along a generally longitudinally arranged rotor.

It should be appreciated that, while the following discussion will be directed principally to transverse fan assembly embodiments as employed in such a combine harvester, the transverse fan assemblies of the present invention are not limited to use in such harvesters, but could equally as well be employed or utilized in or with other harvesters and equipment, including harvesters that employ dual rotor threshing systems and with equipment for other applications, or with other equipment or in other circumstances and situations, consistent with the principles and teachings expounded.

For convenience of reference and understanding in the following discussions, and with respect to the various drawings and their descriptions, the point of reference for the use of various terms that are hereafter employed, including "left", "right", "forward", "rearward", "front", "back", "top", and "bottom", should generally be considered to be a point at the rear of the machine facing in its normal direction of travel, unless it is clear from the discussion and context that a different point of reference is appropriate. Any use of such terms should therefore be considered exemplary and should not be construed as limiting or introducing limitations.

Moreover, inasmuch as various components and features of harvesters and fan assemblies are of well known design, construction, and operation to those skilled in the art, the details of such components and their operations will not generally be discussed in significant detail unless considered of pertinence to the present invention or desirable for purposes of better understanding.

Against such backdrop, and with reference again to FIGS. 1 and 2, the self-propelled combine harvester 12 is operatively powered by an engine (not shown) suitably housed within a body 14 of the combine harvester, which body 14 includes a cab 15 for a user, to provide driving power for the harvester 12. The transfer of rotation and power from the engine to various driven components of the combine is of a conventional nature and could include fixed or variable belt or chain drives which are not shown for purposes of clarity.

At its front end, combine harvester 12 is provided with a conventional crop harvesting header 16. The choice of header, of course, does not limit or relate to the present invention. The crop harvesting header 16 cuts and directs crop material into a conventional threshing apparatus 18.

As is well known in the art, and as is better illustrated in FIG. 2, the threshing apparatus 18 typically includes a rotor assembly 20, including a relatively large diameter rotor 22 that is mounted within a threshing cage 24. Disposed about the cage 24 is a simple system of concaves 26 and separating grates 28 which, through the action of the rotor 22 and centrifugal force, act to separate grain material from other crop residue that is too large to pass through the concaves 26 and grates 28, sometimes hereafter referred to as straw.

The threshed grain material is delivered to a cleaning system 29 that typically includes a pair of vertically spaced apart cleaning sieves 30 and 32 while the straw is propelled rearwardly through the rotor assembly 20 where a conventional beater 40 acts upon the crop residue discharged from the rotor assembly 20. Beater 40 propels the crop residue from the rear of the rotor assembly 20 and throws it back for broad discharge from the rear end of the combine.

One example of such a combine harvester and its component systems is further described in U.S. Pat. No. 5,599,162, which is incorporated herein in its entirety by reference thereto. For purposes of consistency and ease of reference and discussion, insofar as is feasible the same reference numerals are employed herein as were utilized in U.S. Pat. No. 5,599,162 to identify like or similar components and features.

As may be observed from FIG. 2, auger 34 moves the threshed grain material to the cleaning sieves 30 and 32, which sieves form part of the cleaning system 29 and are mounted for oscillation to separate grain from other larger pieces of threshed crop material. As the sieves 30 and 32 are vibrated or oscillated, the grain falls through the sieves 30 and 32 to an underlying clean grain pan 35 and into a clean grain trough or collector 36. An auger 38 directs the grain from the clean grain trough 36 into a hopper or grain bin (not shown) often housed generally directly behind the cab 15 (FIG. 1) within combine harvester body 14.

The threshed grain material that is too large to fall through the sieves 30 and 32 forms a relatively large crop mat or veil extending across substantially the entire sieve construction, as fan assembly 10 provides air that is blown upwardly and rearwardly, as denoted by arrows A, through sieves 30 and 32. Such air flow acts to blow lighter, non-grain elements, sometimes referred to as chaff, away from the crop mat remaining on the sieves 30 and 32 towards the rear of the harvester, where such chaff is handled in conventional and well-known manners.

The larger and heavier threshed crop material, sometimes referred to as tailings, that remains on the sieves 30 and 32 as they continue to vibrate or oscillate is caused to pass over the ends of the sieves 30 and 32 to fall to an underlying tailings pan and into a tailings trough or collector 37. An auger 39 directs the tailings from the tailings trough to a tailings return conveyor system (not shown) that is operable to carry the tailings upwardly, back to the cleaning or separating systems of the combine harvester 12, for reprocessing, which may include further threshing of such tailings.

FIGS. 2-9 depict, in greater detail, a fan assembly 10, and components thereof, constructed to include a cut-off construction 11 in accordance with the present invention, with FIG. 2 depicting in greater detail such fan assembly 10 in combination with the cleaning sieves 30, 32, towards which sieves the air outflow from fan assembly 10 is directed. In the particular embodiment illustrated, the fan assembly 10 comprises an elongated transverse or cross-flow fan 42 within an air plenum 44, with fan 42 extending generally transversely across a great extent, preferably substantially the entire width, of the combine harvester 12. More specifically, as shown in FIG. 2, fan 42 is generally transversely mounted on the combine harvester 12 beneath the threshing apparatus 18 and preferably forward of the cleaning sieves 30, 32.

As better shown in FIGS. 3-7, fan 42, sometimes referred to as a fan rotor, includes a central and preferably elongated hub or axle 46 defining an elongated axis of a rotation 48 for the fan, a plurality of closely spaced fan blades 50 generally extending adjacent to and along axle 46, in an axially aligned configuration, and projecting outwardly in a circumferential array or pattern about the axis of rotation 48, to define an open center for the fan 42, and a plurality of fan blade mounting disks 52, spaced and aligned along axle 46, to which the fan blades 50 are mounted.

Other fan embodiments that differ in various regards from fan 42, including by having fan blades that are disposed to wrap around the axle instead of extending in an axially aligned configuration, can also be conveniently utilized in transverse fan assemblies such as fan assembly 10, and cut-off constructions according to the present invention can be readily employed therewith, as will be further addressed hereinafter.

In the particular fan 42 embodiment depicted in FIGS. 2-9, however, the fan blades 50 are disposed in an axially aligned configuration in which the fan blades 50 are disposed in a cylindrical pattern with the outer tips of fan blades 50 being in substantially parallel axial alignment with the axis 48. As better illustrated in FIGS. 4 and 5, such fan blades 50 are preferably arranged about axis 48 in closely spaced relation relative to each other, with spacings between adjacent fan blades being generally uniform and with each fan blade 50 having an arcuate forwardly curved shape. The configuration of such fan blades 50, and the significance thereof relative to the present invention, will be addressed in greater detail hereinafter. In fan 42 and other generally preferred forms of the fan, each fan blade 50 is typically formed from a material such as sheet metal and is connected or mounted to the fan blade mounting disks 52.

Each fan blade mounting disk 52 is a disk-shaped member that is connected to and extends generally radially outward from the axle 46 for driving the fan blades 50 mounted thereto. Such mounting disks 52 are preferably of substantially uniform diameter and, while shown in the noted figures as having a generally round geometric configuration, could take any suitable shape, such as, for example, spoke-shaped, star-shaped, and the like. At least a pair of fan blade mounting disks 52 are arranged toward opposite ends of the fan 42, but, since the length or expanse of the transverse fan 42 across air plenum 44 is functionally unlimited, additional disks 52 may be provided along the expanse of the fan 42 to counteract centrifugal forces acting on the blades 50 during operation of the fan assembly 10.

Air plenum 44, which is preferably fabricated from an air impervious material, and as is better shown in FIGS. 2, 3, 5, and 7, extends generally cross-wise across the combine harvester 12 and envelops a significant portion of fan 42 therewithin. As better shown in FIG. 5, in the embodiment depicted therein, air plenum 44 extends along substantially and somewhat beyond the entire expanse of the fan 42, which is generally disposed within air plenum 44 extending generally transversely to the forward direction of travel of combine harvester 12. Axle 46 of fan 42 is typically supported and rotatably mounted in bearing blocks 58 and 60 secured at opposite sides of the air plenum 44, although it will be understood that various other constructions could be equally as well utilized to provide such support and that various constructions and systems of known design and operation can be readily employed to effect rotation of the fan 42 about its axis of rotation 48.

Figure 3:
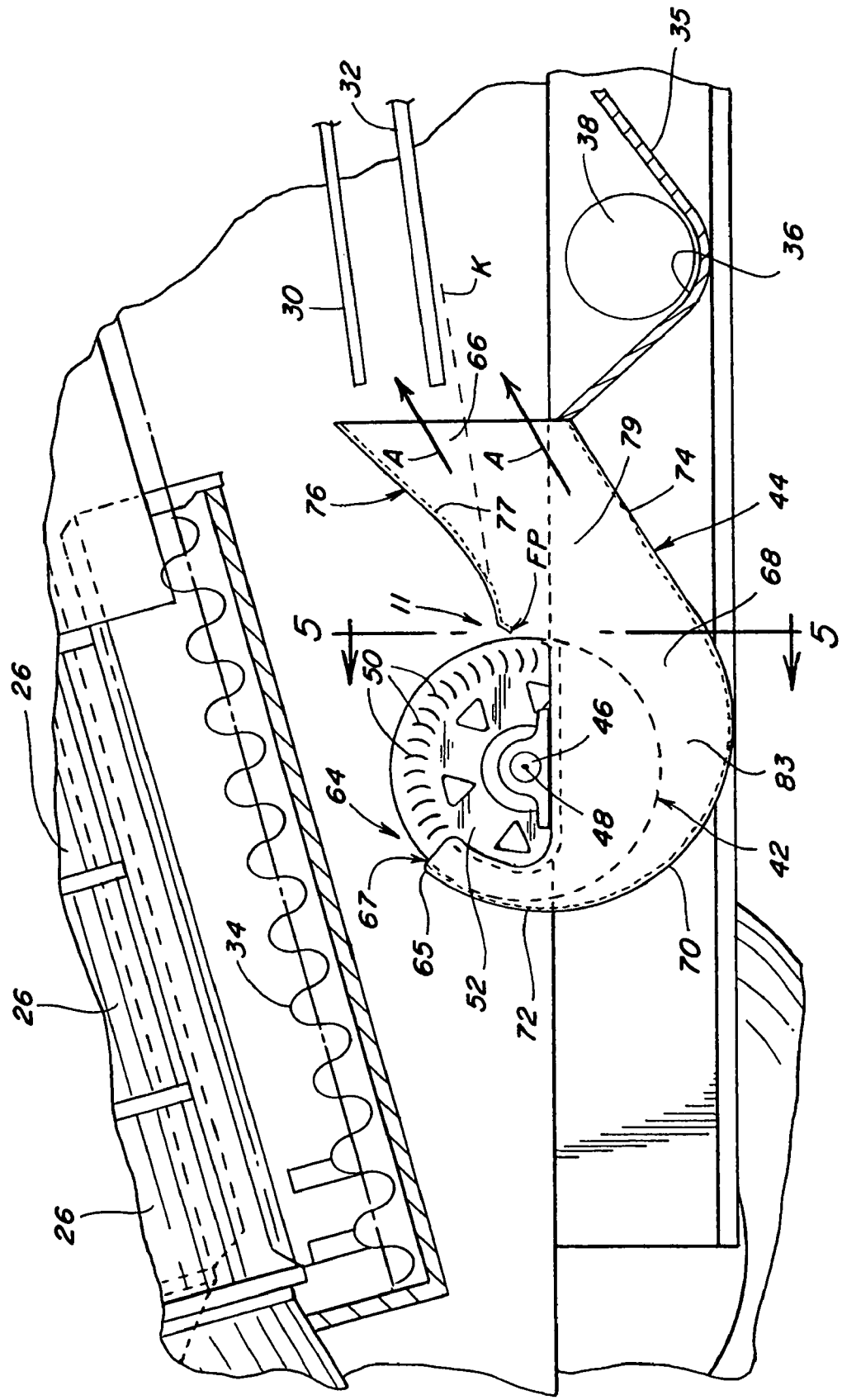
FIG. 3 is an enlarged cross-sectional view of the transverse fan assembly of FIG. 2.
Figure 5:
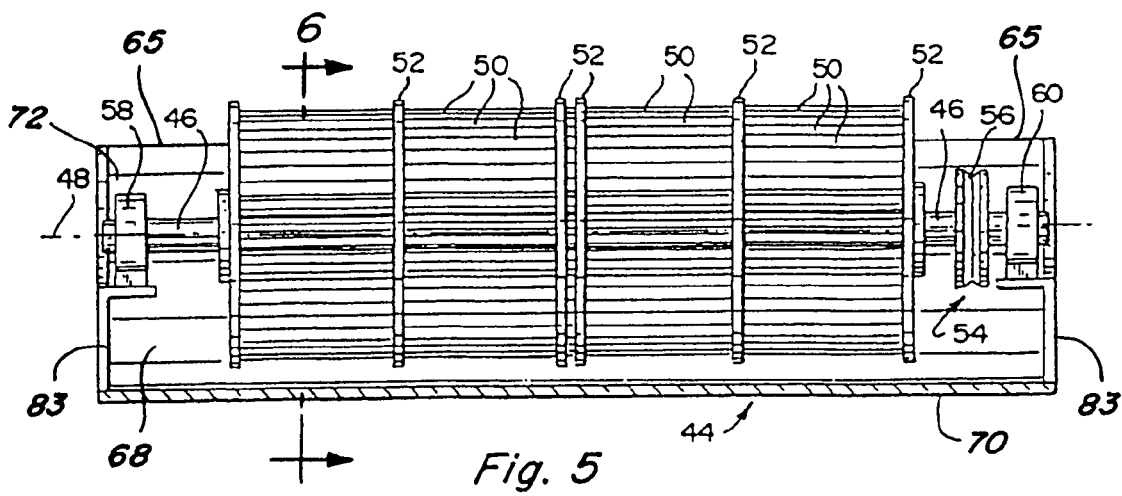
FIG. 5 is a sectional view taken along line 5-5 of FIG. 3, looking forward.
Figure 6:
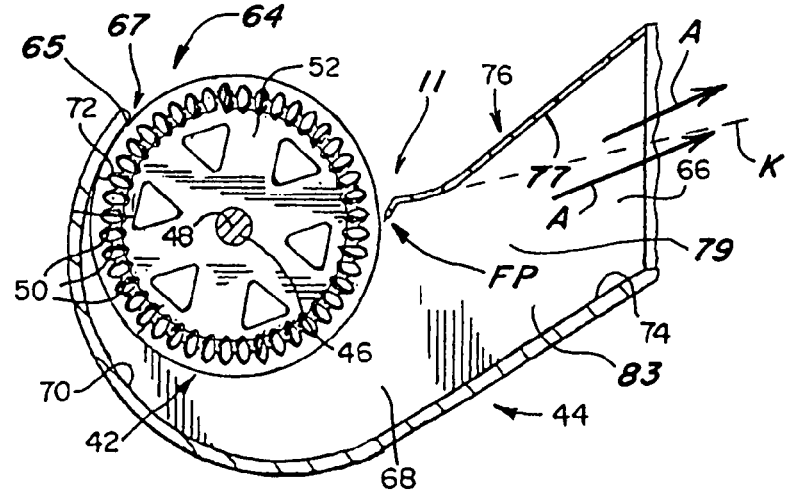
FIG. 6 is an enlarged, sectional side view of the fan assembly of FIG. 5 taken along line 6-6 of FIG. 5.

In the embodiment depicted, air plenum 44, when viewed from the left side of the harvester 12, as best shown in FIGS. 2, 3, and 6, has a cross-sectional scroll-like configuration, with an air inlet 64 (FIG. 3), sometimes hereinafter referred to as air inlet opening 64, an air outlet 66, sometimes hereinafter referred to as air outlet opening 66, and an internal chamber 68 in which fan 42 is mounted. As better shown in FIG. 6, such air plenum 44 includes a continuous lower wall 70 that has an upstream curvilinear face 72 and a downstream curvilinear face 74, an upper air directing construction, such as baffle 76, and side walls 83, which side walls are better shown in FIG. 5.

Lower wall 70 wraps about the forward portion of fan 42, from air inlet opening 64 at the leading edge 65 of such lower wall 70, and extends generally rearwardly to air outlet opening 66. The upstream curvilinear face 72 of lower wall 70 is disposed closely adjacent the outer periphery of fan 42 to form an air inlet entryway 67 at and adjacent to the leading edge 65, and the downstream curvilinear face 74 extends rearwardly and upwardly, at an increasing distance from the fan 42, toward the sieves 30, 32 for directing air drawn into the fan 42 from air inlet 64 through air inlet entryway 67 rearwardly through internal chamber 68 towards air outlet opening 66 for discharge therethrough.

Baffle 76 generally extends between cut-off construction 11, which is shown disposed at the forward or inner end portion of such baffle 76 generally proximate to the rearmost outer periphery of fan 42 at forward position FP (FIG. 6), to a rear or outer end portion at air outlet 66. In general, baffle 76, along with cut-off construction 11, serves to separate air inlet 64 from air outlet 66 and to direct the air flow from fan 42 towards air outlet 66. To avoid undesirable disruptions and turbulence in such air flow, the interior surface of baffle 76, which forms a portion of the upper wall 77 for the output throat 79 of air plenum 44 from the downstream side of fan 42 to air outlet 66, is preferably generally smooth and devoid of projections and recesses that might interrupt the air flow therealong or result in the generation of undesirable vortices or other anomalies or disruptions in such air flow.

With such a construction, as fan 42 is rotated forwardly air will thus be drawn into and through air inlet entryway 67 in an air flow pathway from air inlet 64, which air inlet 64 typically extends across the top side of the fan 42 and is bounded rearwardly by cut-off 11 and baffle 76. The air so drawn into air plenum 44 by the rotation of fan 42 will be moved by operation of fan 42 through the output throat 79 in air plenum 44 towards air outlet 66 to be forcibly discharged through air outlet 66, as shown by arrows A.

Figure 7:
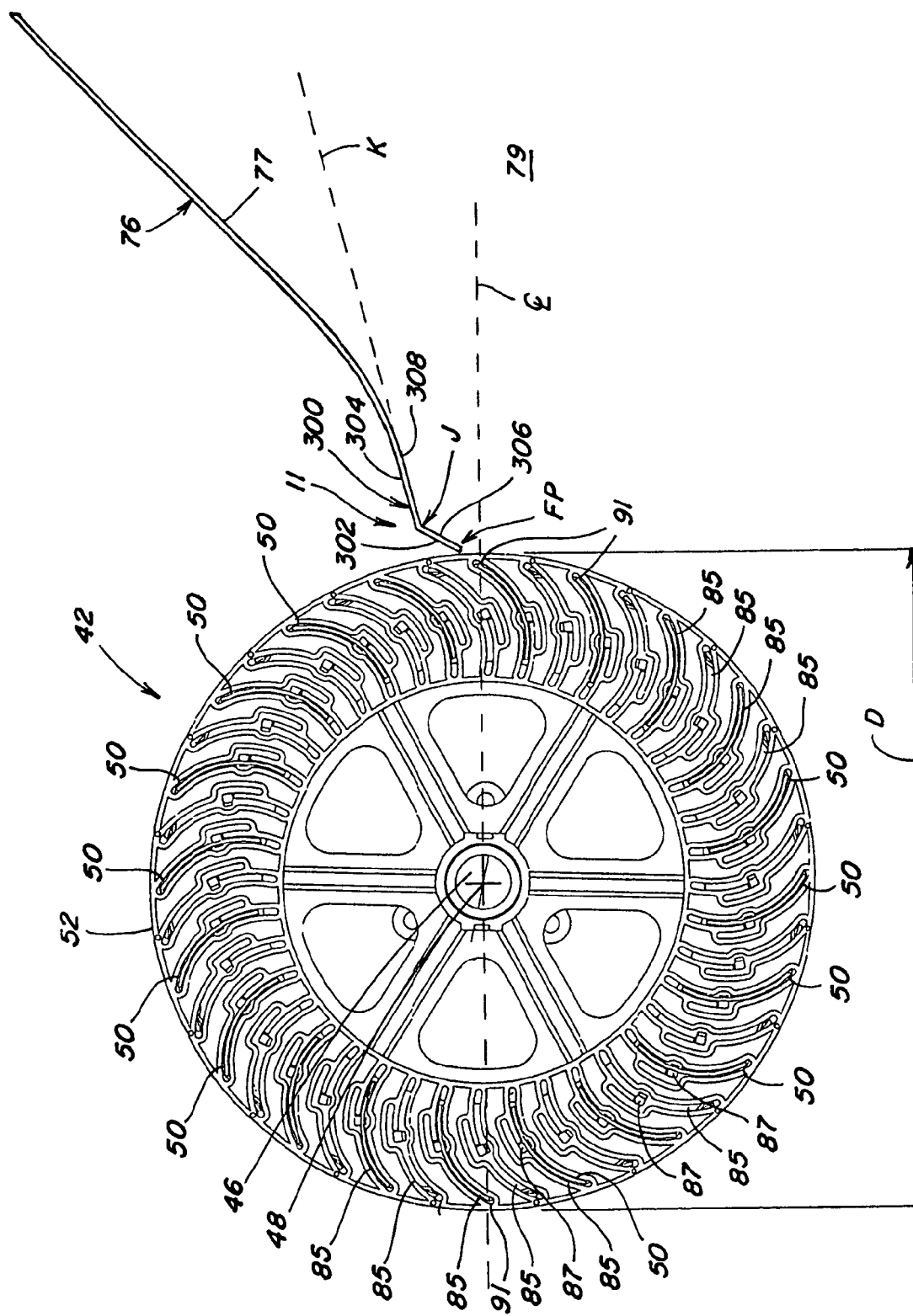
FIG. 7 is a more enlarged side view of the fan rotor and cut-off construction portions of the fan assembly depicted in FIG. 6, better showing the relationship between the arcuate fan blades and the cut-off construction.
Figure 8:
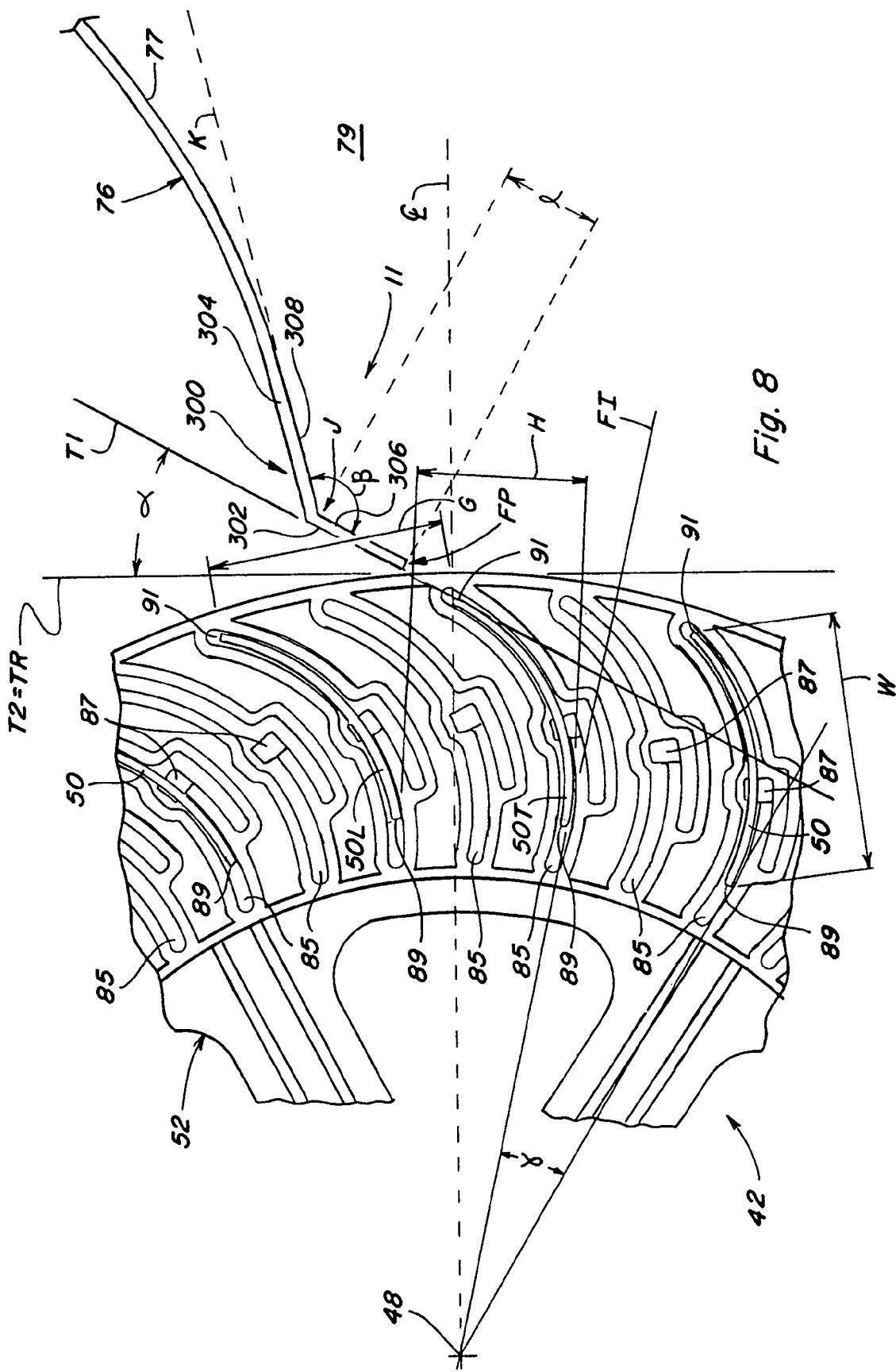
FIG. 8 is a more enlarged, fragmentary side view of a portion of the fan rotor better illustrating the mounting of the fan blades and the spacing between such fan blades, as well as the relationship thereof with the cut-off construction.

As can be most readily observed from FIGS. 7 and 8, the fan blades 50 and the fan blade mounting disks 52 of fan 42 are so designed that the fan blades 50 can be complementarily mounted and releasably secured to fan blade mounting disks 52, each of which fan blade mounting disks 52 is preferably of molded construction of metal or plastics material. In the depicted exemplary fan blade mounting disk embodiment, fan blade mounting disk 52 includes a plurality of arcuately shaped axially facing fan blade mounting grooves 85 therein at angularly spaced locations about axis 48. Each mounting groove 85 is adapted for receiving therein a fan blade 50 of arcuate cross-section and includes a detent tab 87 that is insertable into a hole (not shown) in a fan blade 50 for retaining such fan blade 50 in such mounting groove 85, as better shown in FIG. 8.

FIG. 8 also illustrates certain spatial relationships for the fan 42 and its components, as well as the cut-off construction 11, that have been found to be beneficial, particularly relative to the configuration of the fan blades 50. In such depiction, fan blades 50 are shown having inner and outer ends 89 and 91 and generally extending radially about axis 48 of fan 42 within complementary mounting grooves 85 into which the fan blades 50 are releasably secured.

Preferably, for a fan 42 that has a diameter D (FIG. 7) of about 15 to 16 inches as measured between the outer peripheries of the fan 42 generally adjacent to the radial outer ends 91 of fan blades oppositely disposed from one another about axis 48, the fan blades 50 will have a height or side-to-side width W (FIG. 8) as measured between inner and outer ends 89 and 91 thereof of between about 2.3 to 2.4 inches and a radius of curvature between about 2.0 and 2.1 inches. To greater or lesser extents, depending upon applications, as well as materials employed, various of such noted dimensions may be proportionately scalable.

In addition, the mounting grooves 85 are preferably configured and disposed in and about the fan blade mounting disks 52 such that, when a fan blade 50 is mounted within a plurality of mounting disks 52 that have been spaced and aligned along axle 46 of fan 42 so that the fan blade 50 is in a generally axially alignment with axis 48, inner end 89 of such fan blade 50 will be so oriented that a line tangent to the inner end 89 of fan blade 50 will pass through axis 48 of the fan, with such tangent line being designated as line FI, as a consequence of which, for the dimensions set forth hereinabove, as better shown in FIG. 8, an angle α equal to about 28° will be formed between blade tip tangent line T1 and fan periphery tangent line T2, which angle α is defined to be the cut-off inclination angle for the present invention.

Figure 4:
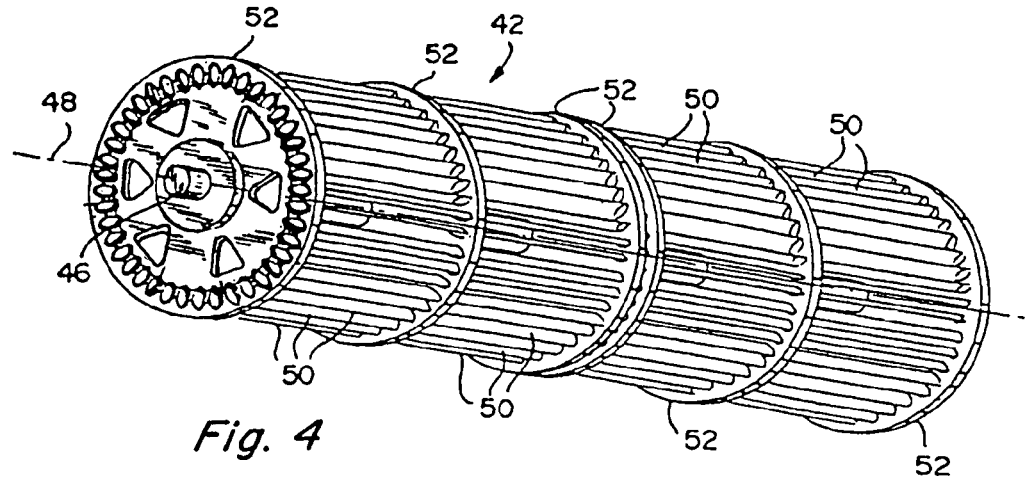
FIG. 4 is a perspective view, from the left rear, of a typical form of a fan rotor assembly of the transverse fan assembly that utilizes axially aligned fan blades of arcuate cross-section.

The fan blade mounting disk 52 of FIGS. 6-8, which is a representative exemplary embodiment of the fan blade mounting disks that may be employed in the fan 42 of FIGS. 4 and 5, is shown, especially in FIGS. 7 and 8, to have fan blades 50 mounted in alternating ones of the mounting grooves 85, thus resulting in twenty fan blades 50 generally axially aligned about axis 46 and radially spaced from one another by an angle γ equal to approximately 18°. With such a mounting configuration, and in accordance with the other dimensions for fan components as set forth hereinabove, the outer ends 91 of adjacent mounted fan blades, labeled as leading fan blade 50L and trailing fan blade 50T, are thus preferably spaced from one another by about 2.3 to 2.4 inches, as denoted by distance G in FIG. 8, and the inner ends 89 of such fan blades 50L and 50T are thus preferably spaced from one another by about 1.6 to 1.7 inches, as designated by distance H in FIG. 8.

In FIGS. 7 and 8 cut-off construction 11 is shown to be a body construction 300 that extends generally across the air plenum 44 and includes first and second plate-like body portions 302 and 304 that are positioned laterally to one another along the top of the output throat 77 of the air plenum, which body portions 302 and 304 each have respective generally planar inner surfaces 306 and 308 on one side thereof facing the output throat 77. First body portion 302 extends generally across the air plenum 44 along forward position FP with, as better shown in FIG. 8, the generally planar inner surface 306 thereof projecting laterally from position FP and extending therefrom along blade tip tangent line T1, as the fan blade labeled SOT rotates past such forward position FP. The angle formed between blade tip tangent line T1 and fan periphery tangent line T2 is the cut-off inclination angle α which, in such embodiment, is approximately 28°.

The generally planar inner surface 306 of such first body portion 302 projects laterally from the forward position FP in the air plenum 44 at cut-off inclination angle α and extends generally along or parallel to blade tip tangent line T1 until it intersects the generally planar inner surface 308 of the second body portion 304 at a juncture J therebetween to form juncture angle β between such planar inner surfaces 306 and 308. The generally planar inner surface 308 of the second body portion 304 projects laterally from such juncture J and extends towards the air outlet along a projection K that extends generally from such juncture J through the output throat 77 towards the air outlet 66 until the inner surface 308 meets and joins the baffle 76 in a generally smooth transition, as better shown in FIGS. 3 and 6.

Consistent with the discussion hereinabove regarding the desirable location of the forward position, forward position FP is shown in FIGS. 7 and 8 to be located near the outer periphery of fan 42 and slightly above centerline CL through fan 42. Although such positioning is favored, forward position FP can, if desired, be located at higher positions above centerline CL and rotated forwardly of the rearmost fan periphery tangent line TR near the outer periphery of the fan, although, as previously indicated, in such event it is then preferable that the angle between the then-forwardly tilted blade tip tangent line T2 and the rearmost fan periphery tangent line TR, defined to be subtended angle θ, fall within a range $0° \leq θ \leq α$. Often, as the subtended angle θ increases in value, the juncture angle β will tend to decrease so that the projection of inner surface 308 will extend through output throat 79 towards the air outlet 66.

Such cut-off construction configuration introduces into the upper wall 77 for the output throat 79, which wall 77 is formed by cut-off construction 11 and the baffle 76, a concavity or recess near the outer periphery of the fan, which concavity and its configuration, especially due to the position of the inner surface 306 of first body portion 302 at cut-off inclination angle α, effects a shift of the steering vortex of the fan in such a way to permit increased air flow volume at lower rotational fan speeds.

With the various components of the fan 42 sized and dimensioned to have the preferred sizes and dimensions as discussed and described hereinabove, the generally planar inner surface 306 of first body portion 302 of cut-off construction 11 preferably extends a distance $\ell$ of approximately 0.75 in. to intersect the generally planar inner surface 308 of second body portion 304 at juncture J. Such juncture J lies within approximately the central third of the distance G between the outer tips of the adjacent fan blades 50L and 50T, as is preferred, and the juncture angle β formed by the intersection of inner surfaces 306 and 308 at juncture J is about 135°.

Figure 9:
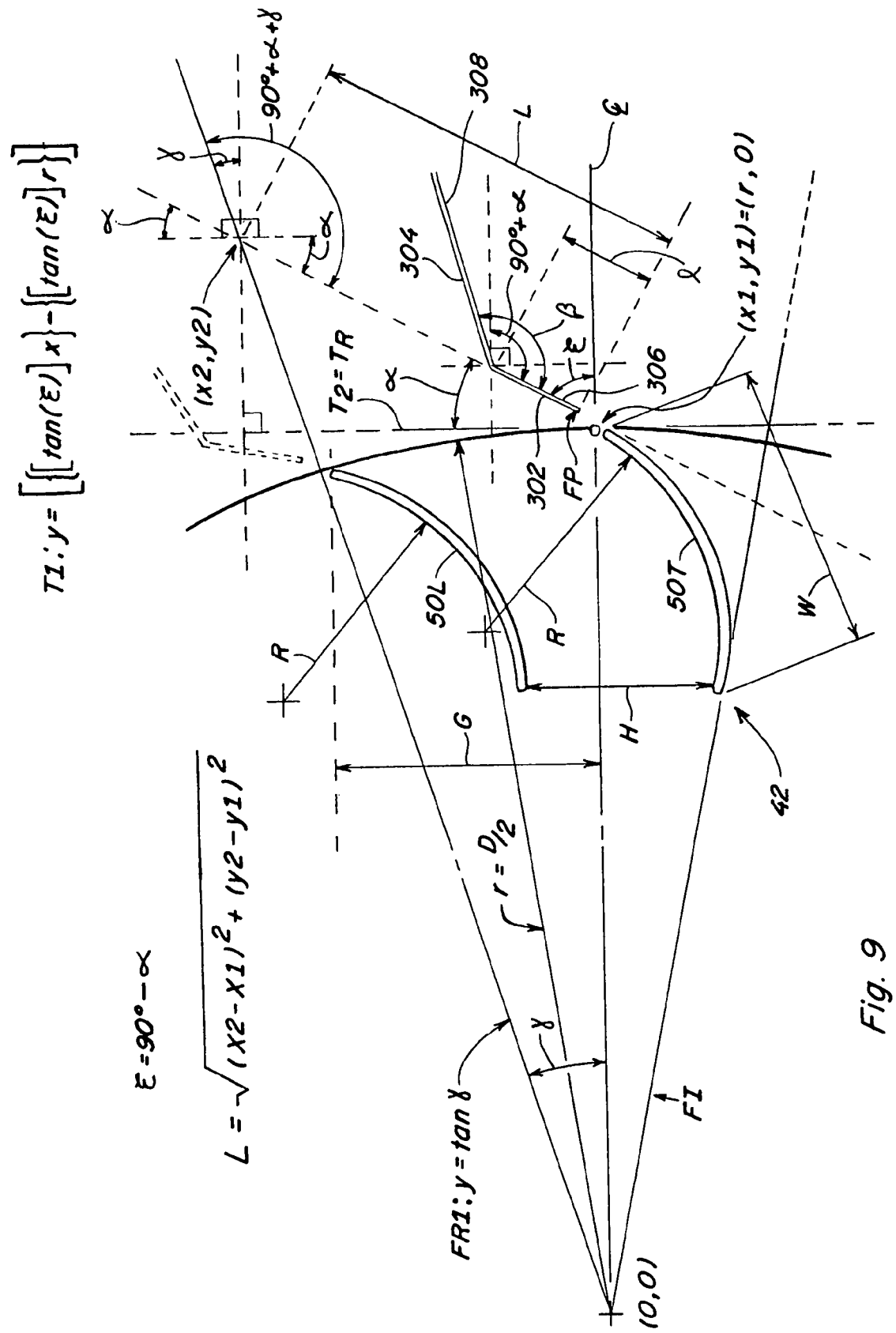
FIG. 9 is an illustration, as from an end of the fan, illustratively depicting adjacent axially aligned fan blades in association with the cut-off construction, better illustrating various parameters and relationships thereof and therebetween.

FIG. 9 is an illustration, corresponding generally to FIG. 8, further illustrating various of the parameters and relationships between the fan 42, its fan blades 50, and the cut-off construction 11, with various of the depicted components and features labeled in accordance with the discussions hereinabove. In such figure inner surface 306 of first body portion is shown extending outwardly or laterally from the fan 42 from a forward position FP closely adjacent to the outer periphery of fan 42 at a cut-off inclination angle α from the outer periphery of fan 42, as defined by a blade tip tangent line T1 and a fan periphery tangent line T2, with fan periphery tangent line T2 in such figure being coincident with the rearmost fan periphery tangent line FR and with forward position FP being located near and slightly above centerline CL. Cartesian coordinates of various points on such figure are set forth, based upon a coordinate system in which the axis 48 of the fan 42 is at coordinate (0,0), with the x-axis lying along centerline CL such that the outer tip 91 of trailing fan blade 50T is at about coordinate (r,0), where r is the radius of the fan 42.

From the FIG. 9 illustration it will be apparent to those skilled in the art how the angles α and β and the preferred maximum length L of the inner surface 306 of first body portion 302 may be determined or established for fans and fan blades of various dimensions and configurations, and also how various parameters of the fan, the fan blades, and the cut-off construction of the present invention interrelate. It should be appreciated that, in accordance therewith, those skilled in the art may re-orient and/or reconfigure the cut-off construction in or with transverse fan assemblies whose components have dimensions that vary from the particular dimensions noted hereinabove and relative to which the preferred embodiment of the cut-off construction has been described and discussed.

By way of example, it may be readily observed from FIG. 9 that a change in the radius of curvature R of the fan blades 50 may result in or require a change of the cut-off inclination angle α and of the preferred maximum length L of the inner surface 306 of first body portion 302, and might also affect the juncture angle β, particularly if the radial tangent at the inner end of the fan blades 50 is maintained aligned with a radian of the fan 42. In somewhat the same vein, if a fan were to have a diameter D different from that of fan 42, corresponding changes occasioned thereby might well be required for a cut-off construction according to the present invention.

To this point, cut-off construction 11 has been described and discussed primarily with respect to its utilization with fans that have generally axially aligned fan blades. It should be understood and appreciated, however, that the utilization of cut-off construction 11 is not restricted to fans with axially aligned fan blades.

In such regard, FIGS. 10 and 11, which correspond generally and respectively to FIGS. 4 and 5, depict a fan 142 of a somewhat different construction than fan 42, which fan 142 may be employed in the transverse fan assembly 10 in place of fan 42, and with which the cut-off construction 11 embodiment, already discussed and described hereinbefore, may also be utilized. Fan 142 includes fan blades 150 disposed to partially wrap around the axle 146 and axis 148 of fan 142 so as to define a chevron blade pattern, with the leading portions of the fan blades 150 being generally centered along the length of the fan 142 as fan 142 and its axle 146 are rotated forwardly about axis 148. In certain situations, fans with such chevron blade patterns are considered to offer certain advantages over fans that, instead, utilize axially aligned fan blades, such as fan 42, including for the purpose of reducing fan noise. The fan 142 is typical of a fan that employs non-axially aligned fan blades.

The fan 142 of FIGS. 10 and 11 includes a plurality of fan blade lengths extending along the axle 146 between the opposite ends of the fan 142, each of which fan blade lengths includes a pair of fan blades 150 disposed generally end-to-end to one another, with each of such fan blades 150 extending from an opposite end of the fan 142 to approximately halfway along the length of the fan to meet near the center of the length of the fan 142. Such fan blades 150, and the fan blade lengths formed thereby, are arranged in spaced alignment relative to one other as they wrap about the axis 148 of fan 142 such that the center portion of each fan blade length is offset in circumferential relation relative to the opposite end thereof. In such configuration the fan blades 150 of each fan blade length thus slant or angle from the opposite ends of the fan 142 toward a peripheral center portion of the fan 142 so that each fan blade length, when viewed looking across the expanse of the fan 142, as in FIG. 11, has a chevron-like configuration between opposite ends thereof, with the chevron "pointing" in the direction of forward fan rotation when the fan is operating, shown as arrows B in FIGS. 10 and 11.

Due to such slanting of the fan blades 150, as the fan operates the resultant flow of air off the fan blades 150 is directed somewhat outwardly toward the fan ends in a manner improving fan performance by lessening end air effects. Such slanted configuration of the fan blades 150 also generally effects a reduction of operating noise (sound) levels of the fan 142. Thus, generally, with a fan such as fan 142, a user can elect to operate the fan 142 at a higher fan speed in order to increase the output flow of air from the fan 142, without concern over increasing environmental noise pollution, or can continue to operate the fan 142 at a lower speed in order to effect a reduction in noise levels.

The degree of slanting, or angle, of the fan blades 150 that may be used for noise reduction is not without limits, however. As the blade angle is increased from zero with respect to the axis of rotation 148, zero angle being an axially straight blade, air flow outwardly from the fan is initially increased, air flow uniformity is improved, and noise is reduced. However, as the fan blade angle is increased further, air flow in the axial direction of the fan increases, lessening the air flowing tangentially from the fan blades which tends to negatively affect air flow rate and uniformity, and to increase noise. Consequently, the amount or degree of slanting of the fan blades is typically chosen by manufacturers and users to be appropriate for any particular fan based upon the intended use of such fan and the effects desired as well as the constructional details of the fan assembly.

As will be appreciated and understood by those skilled in the art, fans with appropriately slanted fan blades, such a fan 142, can be readily utilized with a cut-off construction according to the present invention, such as cut-off construction 11, including by substituting fan 142 in place of fan 42 in the transverse fan assembly 10 of FIGS. 1-3 and 7-8. In such event the advantages attendant to the use of both a chevron-bladed fan and the cut-off construction of the present invention may be realized in the resulting transverse fan assembly.

It should further be appreciated and understood, however, that, consistent with the spirit and scope of the invention, cut-off construction embodiments other than that described and discussed hereinabove can also be developed and employed with fans of these or other configurations. By way of example, and not of limitation, FIG. 12, which corresponds generally to FIG. 8, depicts an exemplary alternative cut-off construction 11' such as might also be utilized with a fan that has axially aligned fan blades, such as fan 42, to achieve results similar to those achieved by the use of cut-off construction 11 with fan 142.

Cut-off construction 11' is a body construction 300' that includes first and second body portions 302' and 304' positioned laterally to one another and extending generally across the air plenum near the outer periphery of fan 42 at its downstream side. The respective generally planar inner surfaces 306' and 308' of such first and second body portions 302' and 304' have respective pairs of opposed inner surface end portions 306A', 306B' and 308A', 308B' that are angularly inclined from their opposite ends at opposite sides of the air plenum towards the center of such air plenum so that such inner surface 306', including inner surface end portions 306A' and 306B', and inner surface 308', including inner surface end portions 308A' and 308B', will, if viewed in cross-section looking towards the air outlet of the air plenum from near the center of the expanse of the fan, thus generally appear to have a tented or inverted "V" shape across the output throat of the air plenum.

At each point along their expanses extending across the air plenum 44 or portions thereof, opposite inner surface end portions 306A' and 306B' of inner surface 306' of first body portion 302 extend angularly from near the outer periphery of fan 42 and generally rearwardly in a plane generally perpendicular to the expanse of the fan 42 from generally adjacent the outer periphery of fan 42 at a cut-off inclination angle α to a juncture with respective inner surface opposite end portions 308A' and 308B' of inner surface 308' of second body portion 304'. In each such plane, the inner surface end portion 306A' or 306B' of first body portion 302' of cut-off construction 11' intersects a respective inner surface end portion 308A' or 308B' of inner surface 308' of second body portion 304' to define a juncture angle β therebetween, with end portion 308A' or 308B' extending from such juncture to join, in a generally smooth transition, baffle 76.

Figure 12:
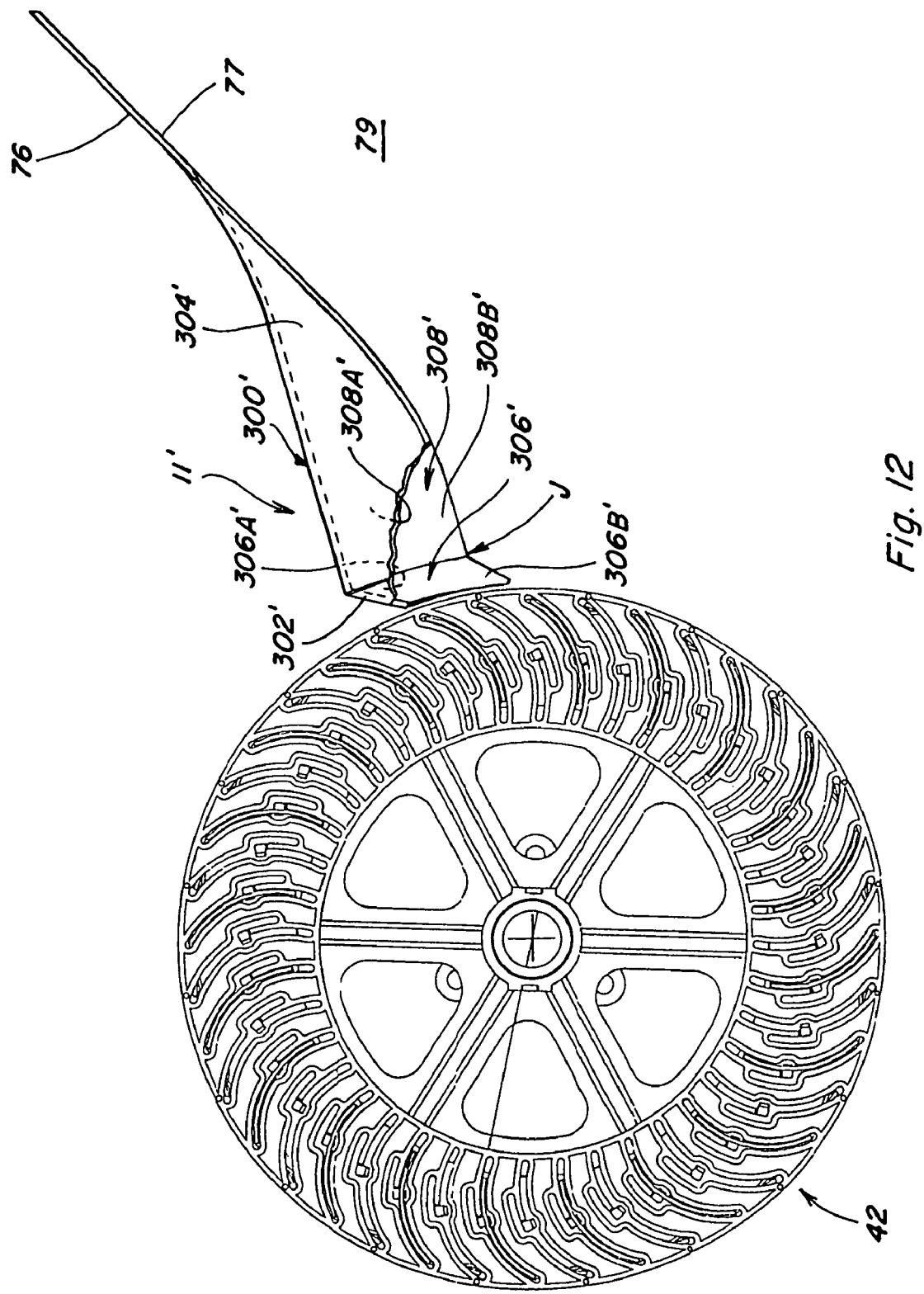
FIG. 12 is a view similar to FIG. 7 but showing a cut-off construction according to the present invention as employed with the fan rotor assembly of FIG. 10.

With such an alternative cut-off construction 11', the juncture angle β formed by the intersection of the inner surfaces 306' and 308' of the first and second body portions 302' and 304' is not uniform along the cross-plenum expanse of the cut-off construction 11', but varies, in FIG. 12, from a larger angle of approximately 135° in a plane near the opposite ends of the fan 42 to a smaller angle of approximately 118° in a plane near the center of the fan 42. In general, however, the inner surfaces 306' and 308' of the first and second body portions 302' and 304' of cut-off construction 11' appear, in any given plane perpendicular to the fan 42 and extending through the output throat 77 of the air plenum 44, to form an inverted "V" shape similar to the inverted "V" shape discussed hereinbefore with respect to the cut-off construction 11 for the fan with axially aligned fan blades.

In the cut-off construction embodiments 11 and 11' discussed and described hereinabove, the first and second body portions thereof have been depicted as plate-like elements, with upper surfaces generally parallel to the inner surfaces which face the output throat 77 of the air plenum. Although, including for ease of construction, such configurations of such first and second body portions are presently considered to be desirable, it should be recognized that the first and second body portions could assume various other shapes and configurations, especially in their upper body shapes, consistent with the present invention and without departing from the spirit and scope of the invention, and that the depiction of the first and second body portions as plate-like elements is not intended to be limiting in any way, except as may be required by the claims which follow.

Additionally, although the cut-off construction of the present invention has been described and discussed herein primarily with respect to its inclusion in or with transverse fan assemblies employed within agricultural combines, it should be understood and appreciated that its use is not limited to such agricultural combines or related equipment, but may more generally be employed with transverse assemblies of various types and for various uses, all within the scope of the present invention and for the intended purposes.

In light of all the foregoing, it should thus be apparent to those skilled in the art that there has been shown and described an improved cut-off construction for transverse fan assemblies that provides the advantages sought therefor. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A cut-off construction for a transverse fan assembly that includes a fan mounted generally cross-wise within an air plenum that has opposite sides, an air inlet, an air outlet, and an output throat from the downstream side of the fan towards the air outlet, with a baffle construction for separating the air inlet and the air outlet, and wherein the fan has a plurality n of spaced elongated fan blades of arcuate cross-section, between inner ends and outer tips thereof, disposed generally radially from one another about the axis of the fan and extending generally along the expanse of the fan, comprising a body construction extending across the air plenum generally along and adjacent to the outer periphery of the fan on the downstream side of the fan along the expanse of the fan and projecting laterally outwardly from the fan, from a forward position in the output throat near the outer periphery of the fan on its downstream side, to join the baffle construction and, with the baffle construction, to form an upper wall along the output throat, said body construction including first and second body portions positioned laterally to one another along the top of the output throat of the air plenum, each having a generally planar inner surface on one side thereof facing the output throat, said first body portion extending across the air plenum along said forward position near the outer periphery of the fan on its downstream side and projecting laterally therefrom with said inner surface thereof extending generally along a first line, defined to be the blade tip tangent line T1, tangent to the outer tip of a fan blade at a given point in the rotation of the fan as such fan blade rotates past said forward position, at a cut-off inclination angle α defined by said blade tip tangent line T1 and a second line, defined to be the fan periphery tangent line T2, generally tangent to the outer periphery of the fan generally at or near such outer tip of the fan blade along blade tip tangent line T1, said generally planar inner surface of said first body portion extending, from said forward position, generally along said blade tip tangent line T1 to intersect said generally planar inner surface of said second body portion at a juncture therebetween and to define a juncture angle β thereat, said generally planar inner surface of said second body portion projecting laterally from said juncture towards the air outlet, along a projection K extending generally through the output throat towards the air outlet, to meet and join the baffle construction, whereby the upper wall for the output throat formed by the baffle construction and said cut-off construction has a concavity formed therein and therealong near the outer periphery of the fan that effects a shift of the steering vortex of the fan in such a way as to permit the fan to operate with increased air flow volume at lower rotational fan speed.

2. The cut-off construction of claim 1 wherein said cut-off inclination angle α is an acute angle and said juncture angle β is an obtuse angle.

3. The cut-off construction of claim 1 wherein said forward position in the output throat is located about at or above a line passing through the frontmost periphery of the fan, the axis of the fan, and the rearmost periphery of the fan, defined to be the centerline CL of the fan, and near the outer periphery of the fan on its downstream side.

4. The cut-off construction of claim 3 wherein the line tangent to the outer periphery of the fan at the rearmost outer periphery is defined to be rearmost fan periphery tangent line TR, said forward position is located above said centerline CL and forward of said rearmost fan periphery tangent line TR, and the angle between blade tip tangent line T2 and said rearmost fan periphery tangent line TR is defined to be subtended angle θ, where $0° \leq \theta \leq \alpha$.

5. The cut-off construction of claim 1 wherein the outer tips of the fan blades are spaced generally laterally from and axially aligned with the axis of the fan and said generally planar inner surfaces of said first and second portions of said body construction extend across the air plenum spaced generally laterally from and axially aligned with the axis of the fan.

6. The cut-off construction of claim 5 wherein said body construction, when viewed from a side of the air plenum looking towards the opposite side thereof, has a generally tilted, inverted "V" configuration with one shorter leg and one longer leg on opposite sides of a mouth of the "V", with said shorter leg nearer the outer periphery of the fan and such inverted "V" configuration tilted to open the mouth of the "V" towards the air outlet with the longer leg extending generally and more towards the air outlet.

7. The cut-off construction of claim 6 wherein said first and second body portions are plate-like members having outer surfaces generally parallel to said inner surfaces.

8. The cut-off construction of claim 1 wherein the fan blades are spaced generally uniformly radially about the axis of the fan with two adjacent fan blades being disposed from one another at an angle γ relative to one another such that the outer tips of said tow adjacent fan blades are thus generally distanced from one another by a blade tip distance of G, and further wherein the length $\ell$ of said generally planar inner surface of said first body portion of said body construction is such that the position of said juncture of said first body portion and said second body portion lies within approximately the central third of the blade tip distance G between the outer tips of said two adjacent fan blades when the outer tip of the trailing of the two adjacent fan blades is generally aligned with blade tip tangent line T1.

9. The cut-off construction of claim 1 wherein the fan blades are spaced generally uniformly radially about the axis of the fan at blade spacing angles γ from one another, where said cut-off inclination angle α is an acute angle, and where the value of said juncture angle β falls within the approximate range $(90°+\alpha) \leq \beta \leq (90°+\alpha+\gamma)$.

10. The cut-off construction of claim 1 wherein the fan blades are spaced generally uniformly radially about the axis of the fan at blade spacing angles γ from one another, where said cut-off inclination angle α is an acute angle, and where said juncture angle β is approximately $90°+\alpha+\gamma$.

11. The cut-off construction of claim 1 wherein said cut-off inclination angle α is approximately 28° and said juncture angle β is approximately 135°.

12. The cut-off construction of claim 11 wherein the fan includes a leading fan blade and a trailing fan blade which are adjacent to and spaced from one another about the axis of the fan at a blade spacing angle γ of approximately 18° and wherein the juncture angle β of approximately 135° is considered to be approximately equal to $90°+\alpha+\gamma$.

13. The cut-off construction of claim 11 wherein the fan includes a leading fan blade and a trailing fan blade which are adjacent to and spaced from one another about the axis of the fan at a blade spacing angle γ, wherein blade tip tangent line T1 is tangent to the outer tip of the trailing fan blade, and wherein the length $\ell$ of said generally planar inner surface of said first body portion of said body construction is less than or equal to the distance from said forward position to the intersection of blade tip tangent line T1 with a radian line of the fan that passes through the outer tip of the leading fan blade, defined to be fan radian line FR1.

14. The cut-off construction of claim 11 wherein the length $\ell$ of said generally planar inner surface of said first body portion of said body construction is approximately 0.75 in.

15. The cut-off construction of claim 1 wherein the outer tips of the fan blades are spaced generally laterally from the axis of the fan and at least partially wrap around the axis of the fan to define a cylindrical pattern, and wherein said generally planar inner surfaces of said first and second portions of said body construction extend across the air plenum generally within respective planes spaced from and axially aligned with the axis of the fan.

16. The cut-off construction of claim 14 wherein said body construction, when viewed from a side of the air plenum looking towards the opposite side thereof, has a generally tilted, inverted "V" configuration with one shorter leg and one longer leg on opposite sides of a mouth of the "V", with said shorter leg nearer the outer periphery of the fan and such inverted "V" configuration tilted to open the mouth of the "V" towards the air outlet with the longer leg extending generally and more towards the air outlet.

17. The cut-off construction of claim 16 wherein said the fan blades of the fan are disposed about the axis of the fan to define a chevron-like arrangement, and wherein, as the fan rotates during its operation and each fan blade length along the expanse of the fan rotates past said cut-off construction, said inner surface of said first body portion of said cut-off construction projects laterally and extends along a blade tip tangent line T1 at the point along a given fan blade length that such fan blade length passes said forward position, such point being defined as the point of passage.

18. The cut-off construction of claim 17 wherein the angles between the blade tip tangent line T1 and the fan periphery tangent line T2 at each point of passage are approximately equal to one another and the cut-off angle α is maintained substantially uniform across the expanse of said inner surface of said first body portion across the air plenum.

19. The cut-off construction of claim 1
wherein the outer tip of a given fan blade defines a first line generally parallel to the axis of the fan, defined as the blade tip cross-plenum line,
wherein, as the fan rotates during its operation and each point along the fan blade length along the expanse of the fan rotates past said cut-off construction, defined as the point of passage for each such point, said inner surface of said first body portion of said cut-off construction at such point of passage projects laterally and extends along a blade tip tangent line T1 therat, and
wherein the angles between the blade tip tangent line T1 and the fan periphery tangent line T2 at each point of passage are approximately equal to one another and the cut-off angle α is maintained substantially uniform across the expanse of said inner surface of said first body portion across the air plenum.

20. The cut-off construction of claim 19 wherein
said inner surface of said first body portion includes oppositely disposed end portions that are angularly inclined from their opposite ends at opposite sides of the air plenum towards the center of the expanse of the air plenum to meet on another approximately at the center of the expanse of the fan,
said inner surface of said second body portion includes oppositely disposed end portions that are angularly inclined from their opposite ends at opposite sides of the air plenum towards the center of the expanse of the air plenum to meet on another approximately at the center of the expanse of the fan,
respective inner surface end portions of said first and second body portions intersect one another at said juncture between said first and second body portions, and
said juncture angle β varies along the expanse of said juncture from a larger value nearer the opposite' sides of the air plenum to smaller values nearer the center of the air plenum.

21. The cut-off construction of claim 20 wherein the juncture angle β along the expanse of said juncture varies within the approximate range $(90°+α) \leq β \leq (90°+α+γ)$.

22. The cut-off construction of claim 20 wherein the cross-sectional configuration across the air plenum, when viewed looking generally from the fan towards the air outlet of the air plenum, of said inner surfaces of said first and second body portions is a generally inverted "V" shape.

23. The cut-off construction of claim 22 wherein, when viewed from a side of the air plenum looking towards the opposite side thereof, in each plane perpendicular to the axis of the fan, the cross-sectional configuration of said body construction has a generally tilted, inverted "V" shape with one shorter leg and one longer leg on opposite sides of a mouth of the "V", with said shorter leg nearer the outer periphery of the fan and such inverted "V" configuration tilted to open the mouth of the "V" towards the air outlet with the longer leg extending generally and more towards the air outlet.

24. A transverse fan assembly operable to permit increased air flow volume at lower rotational fan speed, comprising
an air plenum having opposite side, an air inlet, an air outlet, an output throat leading towards said air outlet, and a baffle construction for separating said air inlet and said air outlet,
a fan having a longitudinal expanse mounted generally cross-wise within said air plenum upstream from said output throat and including an outer periphery and an axis extending generally across said air plenum about which said fan and its outer periphery are rotatable,
said fan having a plurality n of spaced elongated fan blades of arcuate cross-section, between inner ends and outer tips thereof, disposed generally radially from one another about the axis of said fan and extending generally along the expanse of said fan,
a cut-off construction extending across said air plenum generally along and adjacent to the outer periphery of the fan on the downstream side of said fan along said expanse of said fan and projecting laterally outwardly from said fan, from a forward position in said output throat near the outer periphery of the fan on its downstream side, to join said baffle construction and, with said baffle construction, to form an upper wall along said output throat,
said cut-off construction including first and second body portions positioned laterally to one another along the top of said output throat of said air plenum, each said body portion having a generally planar inner surface on one side thereof facing said output throat,
said first body portion extending across said air plenum along said forward position near the outer periphery of said fan on its downstream side and projecting laterally therefrom with said inner surface thereof extending generally along a first line, defined to be the blade tip tangent line T1, tangent to the outer tip of a fan blade at a given point in the rotation of said fan as such fan blade rotates past said forward position, at a cut-off inclination angle α defined by said blade tip tangent line T1 and a second line, defined to be the fan periphery tangent line T2, generally tangent to the outer periphery of the fan, generally at or near such outer tip of the fan blade along blade tip tangent line T1,
said generally planar inner surface of said first body portion extending from said forward position generally along said blade tip tangent line T1 to intersect said generally planar inner surface of said second body portion at a juncture therebetween to define a juncture angle β thereat,
said generally planar inner surface of said second body portion projecting laterally from said juncture towards said air outlet, along a projection K extending generally through said output throat towards said air outlet, to meet and join said baffle construction,
whereby the upper wall for the output throat formed by the baffle construction and said cut-off construction has a concavity formed therein and therealong near the outer periphery of the fan that effects a shift of the steering vortex of the fan in such a way as to permit the fan to operate with increased air flow volume at lower rotational fan speed.

25. The transverse fan assembly of claim 24 wherein, when viewed from a side of the air plenum looking towards the opposite side thereof, in each plane perpendicular to the axis of the fan, the cross-sectional configuration of said body construction has a generally tilted, inverted "V" shape with one shorter leg and one longer leg on opposite sides of a mouth of the "V", with said shorter leg nearer the outer periphery of the fan and such inverted "V" configuration tilted to open the mouth of the "V" towards the air outlet with the longer leg extending generally and more towards the air outlet.

* * * * *